United States Patent
Jia et al.

(10) Patent No.: US 10,397,609 B2
(45) Date of Patent: Aug. 27, 2019

(54) METHOD AND APPARATUS FOR PREDICTING RESIDUAL

(75) Inventors: Jie Jia, Beijing (CN); Hongbin Liu, Beijing (CN)

(73) Assignee: LG ELECTRONICS (CHINA) R & D CENTER CO., LTD, Beijing (CN)

( * ) Notice: Subject to any disclaimer, the term of this patent is extended or adjusted under 35 U.S.C. 154(b) by 842 days.

(21) Appl. No.: 14/395,744

(22) PCT Filed: Jul. 6, 2012

(86) PCT No.: PCT/CN2012/078291
§ 371 (c)(1),
(2), (4) Date: Feb. 14, 2015

(87) PCT Pub. No.: WO2013/155795
PCT Pub. Date: Oct. 24, 2013

(65) Prior Publication Data
US 2015/0215642 A1    Jul. 30, 2015

(30) Foreign Application Priority Data
Apr. 19, 2012 (CN) .......................... 2012 1 0116646

(51) Int. Cl.
*H04N 19/597* (2014.01)
*H04N 19/176* (2014.01)
(Continued)

(52) U.S. Cl.
CPC .......... *H04N 19/597* (2014.11); *H04N 19/11* (2014.11); *H04N 19/176* (2014.11); *H04N 19/52* (2014.11);
(Continued)

(58) Field of Classification Search
CPC .... H04N 19/597; H04N 19/11; H04N 19/176; H04N 19/52; H04N 19/577; H04N 19/593; H04N 19/46; H04N 13/0007; H04N 13/0048
See application file for complete search history.

(56) References Cited

U.S. PATENT DOCUMENTS

2009/0041121 A1*  2/2009  Chen ................... H04N 19/105
                                                            375/240.12

FOREIGN PATENT DOCUMENTS

CN    101309412    11/2008
CN    101783954    7/2010
(Continued)

OTHER PUBLICATIONS

Bartnik et al., "HEVC Extension for Multiview Video Coding and Multiview Video plus Depth Coding", ITU—Telecommunications Standardization Sector, Video Coding Experts Group (VCEG), Feb. 2012 (42 pages).*

(Continued)

*Primary Examiner* — William C Vaughn, Jr.
*Assistant Examiner* — Joseph Daniel A Towe
(74) *Attorney, Agent, or Firm* — Hanley, Flight and Zimmerman, LLC

(57) ABSTRACT

Embodiments of the present invention provide a method and an apparatus for predicting a residual, which method is applied to three-dimensional video encoding or multi-visual angle video encoding and comprises searching, when performing inter frame image prediction encoding on a prediction unit, a corresponding unit of the prediction unit in an adjacent visual angle encoded at the same time; and predicting a time domain predicted residual of the prediction unit by utilizing a time domain predicted residual of the corresponding unit in the encoded adjacent visual angle. The method is applied to three-dimensional video decoding or multi-visual angle video decoding and comprises judging, when performing inter frame image prediction decoding on a prediction unit, whether the prediction unit adopts a residual prediction; searching, if it is determined the prediction unit adopts the residual prediction, a corresponding unit of the prediction unit in an adjacent visual angle decoded at the same time; and predicting a predicted residual of the prediction unit by utilizing a time domain predicted residual of the corresponding unit in the decoded adjacent visual angle. The present invention improves video compression ratio and enhances encoding/decoding efficiencies.

8 Claims, 3 Drawing Sheets

(51) Int. Cl.
  *H04N 19/593* (2014.01)
  *H04N 19/11* (2014.01)
  *H04N 19/52* (2014.01)
  *H04N 19/577* (2014.01)
  *H04N 19/46* (2014.01)

(52) U.S. Cl.
  CPC ......... *H04N 19/577* (2014.11); *H04N 19/593* (2014.11); *H04N 19/46* (2014.11)

(56) References Cited

FOREIGN PATENT DOCUMENTS

EP        1833257         9/2007
WO     2011008065        1/2011
WO    WO 2011008065 A2 *  1/2011   ..... H04N 21/234327

OTHER PUBLICATIONS

Bartnik et al., "HEVC Extension for Multiview Video Coding and Multiview Video plus Depth Coding", ITU—Telecommunications Standardization Sector, Video Coding Experts Group (VCEG), Feb. 2012 (42 pages). (Year: 2012).*

International Search Authority / CN, "International Search Report", issued in connection with International Patent Application No. PCT/CN2012/078291, dated Jan. 24, 2013 (3 pages).

The State Intellectual Property Office of China, "First Office Action", issued in connection with Chinese Patent Application No. 201210116646.7, dated Feb. 20, 2017 (12 pages).

* cited by examiner

METHOD AND APPARATUS FOR PREDICTING RESIDUAL

The present application claims priority to a Chinese Patent Application with application No. 201210116646.7 and entitled "method and apparatus for predicting residula" filed with State Intellectual Property Office of the People's Republic of China on Apr. 19, 2012, which are hereby incorporated by reference.

FIELD OF TECHNOLOGY

The present invention relates to the technical field of video encoding/decoding and, in particular, to a method and an apparatus for predicting a residual.

BACKGROUND OF THE INVENTION

In three-dimensional video encoding or multi-visual angle video encoding, there is a video with multi-visual angle which needs to be encoded. In order to make full use of the correlation between videos with adjacent visual angles, the existing method not only uses an image in an encoded visual angle to predict an image in a visual angle to be encoded, but also uses a residual image in an encoded visual angle to predict a residual image in a visual angle to be encode.

On one hand, since an inter-visual predicted residual is not highly relevant in different visual angles, the inter-visual predicted residual is not used to predict any residual; on the other hand, a time domain predicted residual is used to predict the time domain predicted residual and the inter-visual predicted residual. However, due to the different characteristics between the time domain predicted residual and the inter-visual predicted residual, predicting the inter-visual predicted residual by using the time domain predicted residual will often cause residual energy to be increased, thereby reducing the encoding efficiency.

SUMMARY OF THE INVENTION

Embodiments of the present invention provide a method and an apparatus for predicting a residual to improve video compression ratio and enhance encoding/decoding efficiencies.

On one aspect, embodiments of the present invention provide a method for predicting a residual, which method is applied to three-dimensional video encoding or multi-visual angle video encoding, and the method comprises:

searching, when performing inter frame image prediction encoding on a prediction unit, a corresponding unit of the prediction unit in an adjacent visual angle encoded at the same time; and predicting a time domain predicted residual of the prediction unit by utilizing a time domain predicted residual of the corresponding unit in the encoded adjacent visual angle.

Optionally, in an embodiment of the present invention, the searching, when performing inter frame image prediction encoding on a prediction unit, a corresponding unit of the prediction unit in an adjacent visual angle encoded at the same time comprises: judging, when performing inter frame image prediction encoding on a prediction unit, whether the prediction unit adopts a time domain prediction; and searching, if it is determined the prediction unit adopts the time domain prediction, a corresponding unit of the prediction unit in an adjacent visual angle encoded at the same time.

Optionally, in an embodiment of the present invention, the predicting a time domain predicted residual of the prediction unit by utilizing a time domain predicted residual of the corresponding unit in the encoded adjacent visual angle comprises: judging whether the corresponding unit in the encoded adjacent visual angle includes a time domain predicted residual and whether the time domain predicted residual is non-zero; and predicting, if it is determined that the corresponding unit in the encoded adjacent visual angle includes a time domain predicted residual and the time domain predicted residual is non-zero, a time domain predicted residual of the prediction unit by utilizing the time domain predicted residual of the corresponding unit in the encoded adjacent visual angle; or, predicting, when the prediction unit adopts a bi-directional prediction and one of two prediction blocks of the prediction unit is a time domain prediction block and another is an adjacent visual prediction block, a time domain predicted residual of the prediction unit by utilizing the weighted time domain predicted residual of the corresponding unit in the encoded adjacent visual angle; otherwise, determining that the predicted residual of the prediction unit does not include the time domain predicted residual and not performing the prediction thereon.

Optionally, in an embodiment of the present invention, the judging, when performing inter frame image prediction encoding on a prediction unit, whether the prediction unit adopts a time domain prediction comprises: judging, according to a flag bit of an encoding unit level, which mode is adopted by the prediction unit in a mode without residual prediction and a mode with residual prediction; and further judging, if determining the prediction unit adopts the mode with residual prediction, whether the prediction unit adopts a time domain prediction.

On another aspect, embodiments of the present invention provide an apparatus for predicting a residual, which apparatus is applied to three-dimensional video encoding or multi-visual angle video encoding, and the apparatus comprises:

an encoding corresponding search unit for searching, when performing inter frame image prediction encoding on a prediction unit, a corresponding unit of the prediction unit in an adjacent visual angle encoded at the same time; and an encoding residual prediction unit for predicting a time domain predicted residual of the prediction unit by utilizing a time domain predicted residual of the corresponding unit in the encoded adjacent visual angle.

Optionally, in an embodiment of the present invention, the encoding corresponding search unit comprises: an encoding time domain judgment module for judging, when performing inter frame image prediction encoding on a prediction unit, whether the prediction unit adopts a time domain prediction; and an encoding corresponding search module for searching, if it is determined the prediction unit adopts the time domain prediction, a corresponding unit of the prediction unit in an adjacent visual angle encoded at the same time.

Optionally, in an embodiment of the present invention, the encoding residual prediction unit comprises: an encoding adjacent visual angle judgment module for judging whether the corresponding unit in the encoded adjacent visual angle includes a time domain predicted residual and whether the time domain predicted residual is non-zero; and an encoding residual prediction module for predicting, if it is determined that the corresponding unit in the encoded adjacent visual angle includes a time domain predicted residual and the time domain predicted residual is non-zero, a time domain predicted residual of the prediction unit by utilizing the time domain predicted residual of the corresponding unit in the encoded adjacent visual angle; or, predicting, when the prediction unit adopts a bi-directional prediction and one of two prediction blocks of the prediction unit is a time domain prediction block and another is an adjacent visual prediction block, a time domain predicted residual of the prediction unit by utilizing the weighted time domain predicted residual of the corresponding unit in the encoded adjacent visual angle; otherwise, determining that the predicted residual of the prediction unit does not include the time domain predicted residual and not performing the prediction thereon.

Optionally, in an embodiment of the present invention, the encoding time domain judgment module is further configured for judging, according to a flag bit of an encoding unit level, which mode is adopted by the prediction unit in a mode without residual prediction and a mode with residual prediction; and further judging, if determining the prediction unit adopts the mode with residual prediction, whether the prediction unit adopts a time domain prediction.

On still another aspect, embodiments of the present invention provide a method for predicting a residual, which method is applied to three-dimensional video decoding or multi-visual angle video decoding, and the method comprises:

judging, when performing inter frame image prediction decoding on a prediction unit, whether the prediction unit adopts a residual prediction;

searching, if it is determined the prediction unit adopts the residual prediction, a corresponding unit of the prediction unit in an adjacent visual angle decoded at the same time; and predicting a predicted residual of the prediction unit by utilizing a time domain predicted residual of the corresponding unit in the decoded adjacent visual angle.

Optionally, in an embodiment of the present invention, the judging, when performing inter frame image prediction decoding on a prediction unit, whether the prediction unit adopts a residual prediction comprises: judging, when performing inter frame image prediction decoding on a prediction unit, which mode is adopted by the prediction unit in a mode without residual prediction and a mode with residual prediction according to a flag bit of an encoding unit level; and further judging, if determining the prediction unit adopts the mode with residual prediction, whether the prediction unit adopts a time domain prediction; searching, if it is determined the prediction unit adopts the time domain prediction, a corresponding unit of the prediction unit in an adjacent visual angle decoded at the same time; judging whether the corresponding unit in the decoded adjacent visual angle includes a time domain predicted residual and whether the time domain predicted residual is non-zero; and determining the prediction unit adopts the residual prediction if it is determined that the corresponding unit in the decoded adjacent visual angle includes a time domain predicted residual and the time domain predicted residual is non-zero.

Optionally, in an embodiment of the present invention, the predicting a predicted residual of the prediction unit by utilizing a time domain predicted residual of the corresponding unit in the decoded adjacent visual angle comprises: adding the time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, adding, when the prediction unit adopts a bi-directional prediction and one of two prediction blocks of the prediction unit is a time domain prediction block and another is an adjacent visual prediction block, the weighted time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, adding directly, when the prediction unit adopts a bi-directional prediction and two prediction blocks of the prediction unit are both adjacent visual prediction blocks, the predicted residual of the prediction unit to a predicted signal of the prediction unit to obtain a reconstruction of the prediction unit.

On yet another aspect, embodiments of the present invention provide an apparatus for predicting a residual, which apparatus is applied to three-dimensional video decoding or multi-visual angle video decoding, and the apparatus comprises:

a decoding residual prediction judgment unit for judging, when performing inter frame image prediction decoding on a prediction unit, whether the prediction unit adopts a residual prediction;

a decoding corresponding search unit for searching, if it is determined the prediction unit adopts the residual prediction, a corresponding unit of the prediction unit in an adjacent visual angle decoded at the same time; and a decoding residual prediction unit for predicting a predicted residual of the prediction unit by utilizing a time domain predicted residual of the corresponding unit in the decoded adjacent visual angle.

Optionally, in an embodiment of the present invention, the decoding residual prediction judgment unit comprises: a decoding time domain judgment module for judging, when performing inter frame image prediction decoding on a prediction unit, which mode is adopted by the prediction unit in a mode without residual prediction and a mode with residual prediction according to a flag bit of an encoding unit level; and further judging, if determining the prediction unit adopts the mode with residual prediction, whether the prediction unit adopts a time domain prediction; a decoding adjacent visual angle judgment module for searching, if it is determined the prediction unit adopts the time domain prediction, a corresponding unit of the prediction unit in an adjacent visual angle decoded at the same time; and for judging whether the corresponding unit in the decoded adjacent visual angle includes a time domain predicted residual and whether the time domain predicted residual is non-zero; and a decoding residual prediction judgment module for determining the prediction unit adopts the residual prediction if it is determined that the corresponding unit in the decoded adjacent visual angle includes a time domain predicted residual and the time domain predicted residual is non-zero.

Optionally, in an embodiment of the present invention, the decoding residual prediction unit is further configured for adding the time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, for adding, when the prediction unit adopts a bi-directional prediction and one of two prediction blocks of the prediction unit is a time domain prediction block and another is an adjacent visual prediction block, the weighted time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, for adding directly, when the prediction unit adopts a bi-directional prediction and two prediction blocks of the prediction unit are both adjacent visual prediction blocks, the predicted residual of the prediction unit to a predicted signal of the prediction unit to obtain a reconstruction of the prediction unit.

The above technical solutions have advantages as follows: the method or the apparatus is applied to three-dimensional video encoding/decoding or multi-visual angle video encoding/decoding, in which the method comprises searching, when performing inter frame image prediction encoding/decoding on a prediction unit, a corresponding unit of the prediction unit in an adjacent visual angle encoded/decoded at the same time; and predicting a predicted residual of the prediction unit by utilizing a time domain predicted residual of the corresponding unit in the encoded/decoded adjacent visual angle, but the time domain predicted residual in the encoded/decoded adjacent visual angle is not used to predict an inter-visual predicted residual of a current visual angle, and thus the embodiments of the present invention improves video compression ratio and enhances encoding/decoding efficiencies. This technology does not damage the structure of the existing image unit on the basis of enhancing encoding/decoding efficiencies, thereby conducive to hardware implementation.

BRIEF DESCRIPTION OF THE DRAWINGS

To make clearer the explanation of technical solutions of the embodiments of the present invention or of the related art, the drawings needed in the description of the embodiments or the related art are briefly illustrated below. Apparently, the drawings illustrated below are merely directed to some embodiments of the present invention, and it is possible for persons ordinarily skilled in the art to deduce other drawings from these drawings without making a creative effort.

DETAILED DESCRIPTION OF THE INVENTION

The technical solutions according to the embodiments of the present invention are clearly and completely described below with reference to the drawings. Apparently, the embodiments as described below are merely partial, rather than entire, embodiments of the present invention. On the basis of the embodiments of the present invention, all other embodiments obtainable by persons ordinarily skilled in the art without creative effort shall all fall within the protection scope of the present invention.

An inventive object of this technical proposal is to improve video compression ratio and enhance encoding/decoding efficiencies without damaging the structure of the existing image encoding unit.

Figure 1:
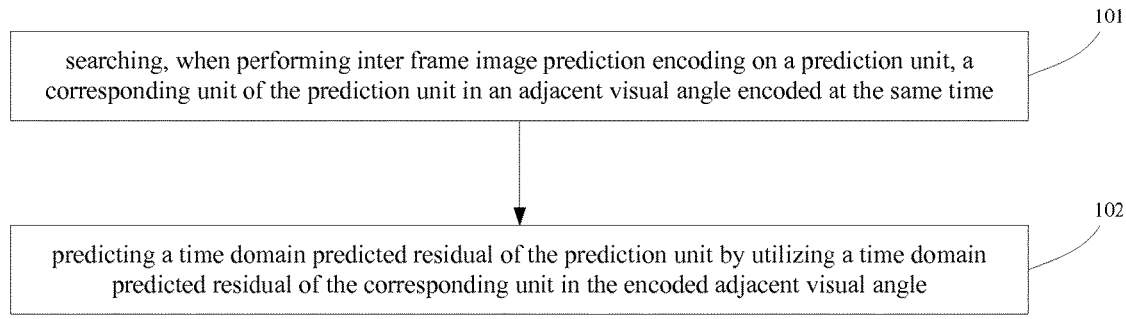
FIG. 1 is a flowchart illustrating a method for predicting a residual according to an embodiment of the present invention.

As shown in FIG. 1, it is a flowchart illustrating a method for predicting a residual according to an embodiment of the present invention, which method is applied to three-dimensional video encoding or multi-visual angle video encoding, and the method comprises:

step 101: searching, when performing inter frame image prediction encoding on a prediction unit, a corresponding unit of the prediction unit in an adjacent visual angle encoded at the same time.

Optionally, the searching, when performing inter frame image prediction encoding on a prediction unit, a corresponding unit of the prediction unit in an adjacent visual angle encoded at the same time comprises: judging, when performing inter frame image prediction encoding on a prediction unit, whether the prediction unit adopts a time domain prediction; and searching, if it is determined the prediction unit adopts the time domain prediction, a corresponding unit of the prediction unit in an adjacent visual angle encoded at the same time. Optionally, the judging, when performing inter frame image prediction encoding on a prediction unit, whether the prediction unit adopts a time domain prediction comprises: judging, according to a flag bit of an encoding unit level, which mode is adopted by the prediction unit in a mode without residual prediction and a mode with residual prediction; and further judging, if determining the prediction unit adopts the mode with residual prediction, whether the prediction unit adopts a time domain prediction.

Step 102: predicting a time domain predicted residual of the prediction unit by utilizing a time domain predicted residual of the corresponding unit in the encoded adjacent visual angle.

Optionally, the predicting a time domain predicted residual of the prediction unit by utilizing a time domain predicted residual of the corresponding unit in the encoded adjacent visual angle comprises: judging whether the corresponding unit in the encoded adjacent visual angle includes a time domain predicted residual and whether the time domain predicted residual is non-zero; and predicting, if it is determined that the corresponding unit in the encoded adjacent visual angle includes a time domain predicted residual and the time domain predicted residual is non-zero, a time domain predicted residual of the prediction unit by utilizing the time domain predicted residual of the corresponding unit in the encoded adjacent visual angle; or, predicting, when the prediction unit adopts a bi-directional prediction and one of two prediction blocks of the prediction unit is a time domain prediction block and another is an adjacent visual prediction block, a time domain predicted residual of the prediction unit by utilizing the weighted time domain predicted residual of the corresponding unit in the encoded adjacent visual angle; otherwise, determining that the predicted residual of the prediction unit does not include the time domain predicted residual and not performing the prediction thereon.

Figure 2:
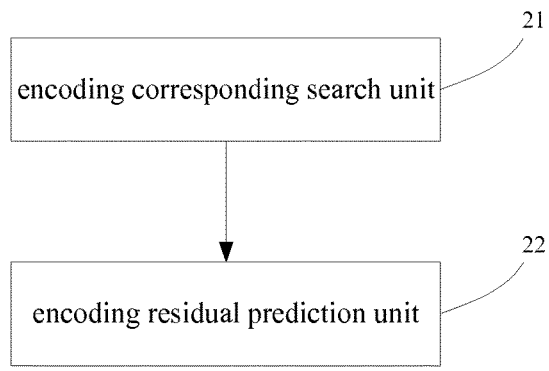
FIG. 2 is a schematic diagram illustrating the structure of an apparatus for predicting a residual according to the embodiment of the present invention.

Corresponding to the above method embodiment, as shown in FIG. 2, it is a schematic diagram illustrating the structure of an apparatus for predicting a residual according to the embodiment of the present invention, which apparatus is applied to three-dimensional video encoding or multi-visual angle video encoding, and the apparatus comprises:

an encoding corresponding search unit 21 for searching, when performing inter frame image prediction encoding on a prediction unit, a corresponding unit of the prediction unit in an adjacent visual angle encoded at the same time; and an encoding residual prediction unit 22 for predicting a time domain predicted residual of the prediction unit by utilizing a time domain predicted residual of the corresponding unit in the encoded adjacent visual angle.

Figure 3:
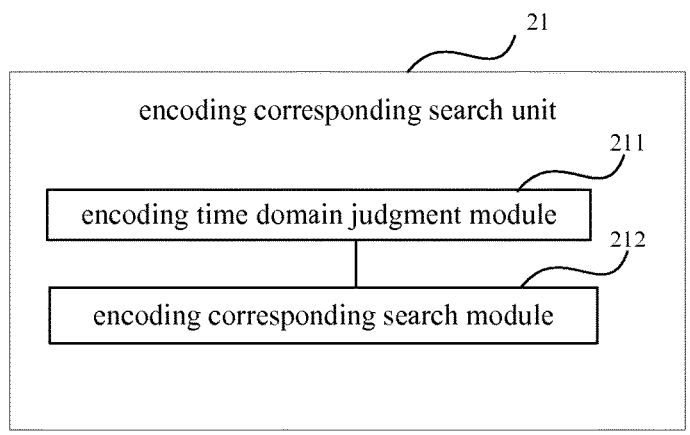
FIG. 3 is a schematic diagram illustrating the structure of an encoding corresponding search unit according to an embodiment of the present invention.

As shown in FIG. 3, it is a schematic diagram illustrating the structure of an encoding corresponding search unit according to an embodiment of the present invention, and the encoding corresponding search unit 21 comprises: an encoding time domain judgment module 211 for judging, when performing inter frame image prediction encoding on a prediction unit, whether the prediction unit adopts a time domain prediction; and an encoding corresponding search module 212 for searching, if it is determined the prediction unit adopts the time domain prediction, a corresponding unit of the prediction unit in an adjacent visual angle encoded at the same time.

Figure 4:
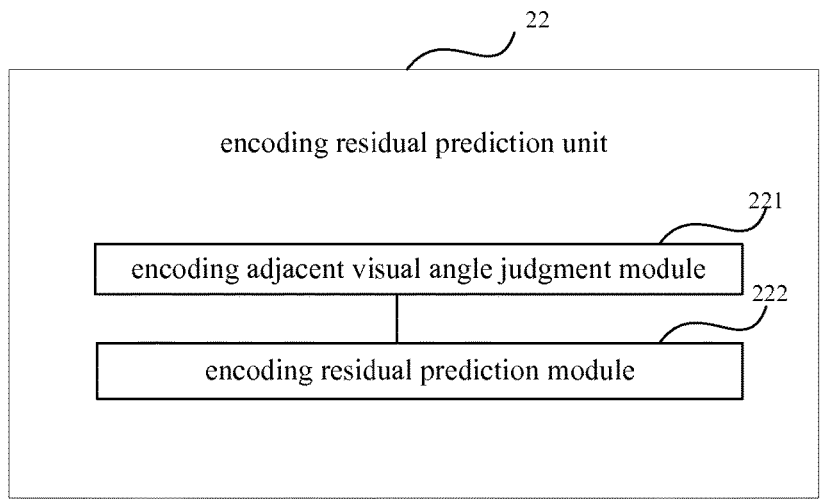
FIG. 4 is a schematic diagram illustrating the structure of an encoding residual predict ion unit according to the embodiment of the present invention.

As shown in FIG. 4, it is a schematic diagram illustrating the structure of an encoding residual prediction unit according to the embodiment of the present invention, and the encoding residual prediction unit 22 comprises: an encoding adjacent visual angle judgment module 221 for judging whether the corresponding unit in the encoded adjacent visual angle includes a time domain predicted residual and whether the time domain predicted residual is non-zero; and an encoding residual prediction module 222 for predicting, if it is determined that the corresponding unit in the encoded adjacent visual angle includes a time domain predicted residual and the time domain predicted residual is non-zero, a time domain predicted residual of the prediction unit by utilizing the time domain predicted residual of the corresponding unit in the encoded adjacent visual angle; or, predicting, when the prediction unit adopts a bi-directional prediction and one of two prediction blocks of the prediction unit is a time domain prediction block and another is an adjacent visual prediction block, a time domain predicted residual of the prediction unit by utilizing the weighted time domain predicted residual of the corresponding unit in the encoded adjacent visual angle; otherwise, determining that the predicted residual of the prediction unit does not include the time domain predicted residual and not performing the prediction thereon. Optionally, the encoding time domain judgment module 211 is further configured for judging, according to a flag bit of an encoding unit level, which mode is adopted by the prediction unit in a mode without residual prediction and a mode with residual prediction; and further judging, if determining the prediction unit adopts the mode with residual prediction, whether the prediction unit adopts a time domain prediction.

The above technical solution has advantages as follows: the method or the apparatus is applied to three-dimensional video encoding or multi-visual angle video encoding, in which the solution comprises searching, when performing inter frame image prediction encoding on a prediction unit, a corresponding unit of the prediction unit in an adjacent visual angle encoded at the same time; and predicting a predicted residual of the prediction unit by utilizing a time domain predicted residual of the corresponding unit in the encoded adjacent visual angle, but the time domain predicted residual in the encoded adjacent visual angle is not used to predict an inter-visual predicted residual of a current visual angle, and thus the embodiments of the present invention improves video compression ratio and enhances encoding efficiencies. This technology does not damage the structure of the existing image unit on the basis of enhancing encoding/decoding efficiencies, thereby conducive to hardware implementation.

Figure 5:
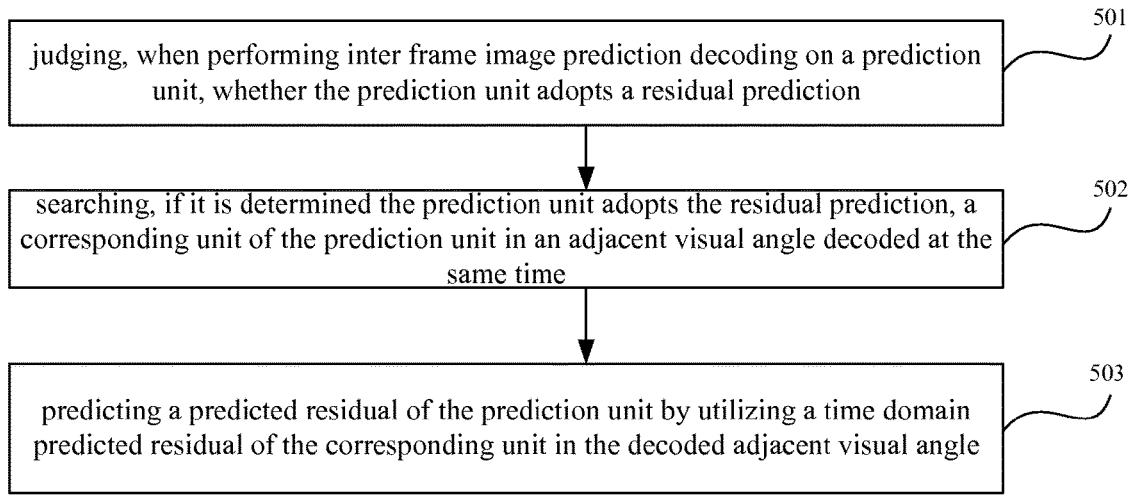
FIG. 5 is a flowchart illustrating another method for predicting a residual according to an embodiment of the present invention.

Corresponding to the above encoding solution, as shown in FIG. 5, it is a flowchart illustrating another method for predicting a residual according to an embodiment of the present invention, which method is applied to three-dimensional video decoding or multi-visual angle video decoding, and the method comprises:

step 501: judging, when performing inter frame image prediction decoding on a prediction unit, whether the prediction unit adopts a residual prediction;

step 502: searching, if it is determined the prediction unit adopts the residual prediction, a corresponding unit of the prediction unit in an adjacent visual angle decoded at the same time; and step 503: predicting a predicted residual of the prediction unit by utilizing a time domain predicted residual of the corresponding unit in the decoded adjacent visual angle.

Optionally, the judging, when performing inter frame image prediction decoding on a prediction unit, whether the prediction unit adopts a residual prediction comprises: judging, when performing inter frame image prediction decoding on a prediction unit, which mode is adopted by the prediction unit in a mode without residual prediction and a mode with residual prediction according to a flag bit of an encoding unit level; and further judging, if determining the prediction unit adopts the mode with residual prediction, whether the prediction unit adopts a time domain prediction; searching, if it is determined the prediction unit adopts the time domain prediction, a corresponding unit of the prediction unit in an adjacent visual angle decoded at the same time; judging whether the corresponding unit in the decoded adjacent visual angle includes a time domain predicted residual and whether the time domain predicted residual is non-zero; and determining the prediction unit adopts the residual prediction if it is determined that the corresponding unit in the decoded adjacent visual angle includes a time domain predicted residual and the time domain predicted residual is non-zero.

Optionally, the predicting a predicted residual of the prediction unit by utilizing a time domain predicted residual of the corresponding unit in the decoded adjacent visual angle comprises: adding the time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, adding, when the prediction unit adopts a bi-directional prediction and one of two prediction blocks of the prediction unit is a time domain prediction block and another is an adjacent visual prediction block, the weighted time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, adding directly, when the prediction unit adopts a bi-directional prediction and two prediction blocks of the prediction unit are both adjacent visual prediction blocks, the predicted residual of the prediction unit to a predicted signal of the prediction unit to obtain a reconstruction of the prediction unit.

Figure 6:
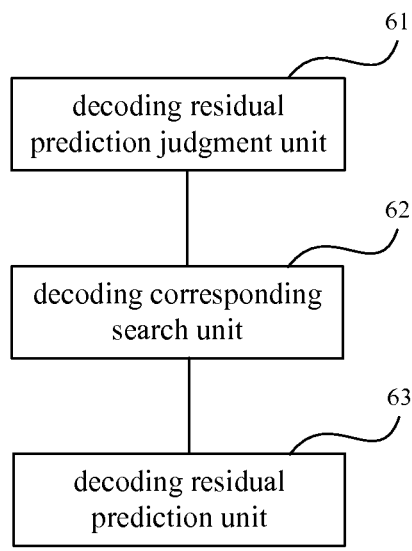
FIG. 6 is a schematic diagram illustrating the structure of another apparatus for predicting a residual according to the embodiment of the present invention.

Corresponding to the above method embodiment, as shown in FIG. 6, it is a schematic diagram illustrating the structure of another apparatus for predicting a residual according to the embodiment of the present invention, which apparatus is applied to three-dimensional video decoding or multi-visual angle video decoding, and the apparatus comprises:

a decoding residual prediction judgment unit 61 for judging, when performing inter frame image prediction decoding on a prediction unit, whether the prediction unit adopts a residual prediction;

a decoding corresponding search unit 62 for searching, if it is determined the prediction unit adopts the residual prediction, a corresponding unit of the prediction unit in an adjacent visual angle decoded at the same time; and a decoding residual prediction unit 63 for predicting a predicted residual of the prediction unit by utilizing a time domain predicted residual of the corresponding unit in the decoded adjacent visual angle.

Figure 7:
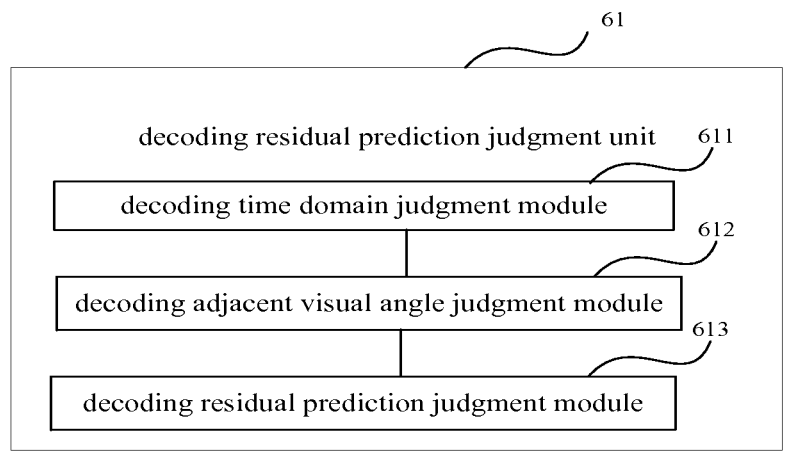
FIG. 7 is a schematic diagram illustrating the structure of a decoding residual prediction judgment unit according to the embodiment of the present invention.

As shown in FIG. 7, it is a schematic diagram illustrating the structure of a decoding residual prediction judgment unit according to the embodiment of the present invention, and the decoding residual prediction judgment unit 61 comprises: a decoding time domain judgment module 611 for judging, when performing inter frame image prediction decoding on a prediction unit, which mode is adopted by the prediction unit in a mode without residual prediction and a mode with residual prediction according to a flag bit of an encoding unit level; and further judging, if determining the prediction unit adopts the mode with residual prediction, whether the prediction unit adopts a time domain prediction; a decoding adjacent visual angle judgment module 612 for searching, if it is determined the prediction unit adopts the time domain prediction, a corresponding unit of the prediction unit in an adjacent visual angle decoded at the same time; and for judging whether the corresponding unit in the decoded adjacent visual angle includes a time domain predicted residual and whether the time domain predicted residual is non-zero; and a decoding residual prediction judgment module 613 for determining the prediction unit adopts the residual prediction if it is determined that the corresponding unit in the decoded adjacent visual angle includes a time domain predicted residual and the time domain predicted residual is non-zero.

Optionally, the decoding residual prediction unit 63 is further configured for adding the time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, for adding, when the prediction unit adopts a bi-directional prediction and one of two prediction blocks of the prediction unit is a time domain prediction block and another is an adjacent visual prediction block, the weighted time domain predicted residual of the corresponding unit in the decoded adjacent visual angle to the predicted residual of the prediction unit to serve as an updated predicted residual of the prediction unit, and then adding the updated predicted residual of the prediction unit to a predicted signal of the prediction unit to obtain a reconstruction of the prediction unit; or, for adding directly, when the prediction unit adopts a bi-directional prediction and two prediction blocks of the prediction unit are both adjacent visual prediction blocks, the predicted residual of the prediction unit to a predicted signal of the prediction unit to obtain a reconstruction of the prediction unit.

The above technical solution has advantages as follows: the method or the apparatus is applied to three-dimensional video decoding or multi-visual angle video decoding, in which the solution comprises searching, when performing inter frame image prediction decoding on a prediction unit, a corresponding unit of the prediction unit in an adjacent visual angle decoded at the same time; and predicting a predicted residual of the prediction unit by utilizing a time domain predicted residual of the corresponding unit in the decoded adjacent visual angle, but the time domain predicted residual in the decoded adjacent visual angle is not used to predict an inter-visual predicted residual of a current visual angle, and thus the embodiments of the present invention improves video compression ratio and enhances decoding efficiencies. This technology does not damage the structure of the existing image unit on the basis of enhancing encoding/decoding efficiencies, thereby conducive to hardware implementation.

Figure 8:
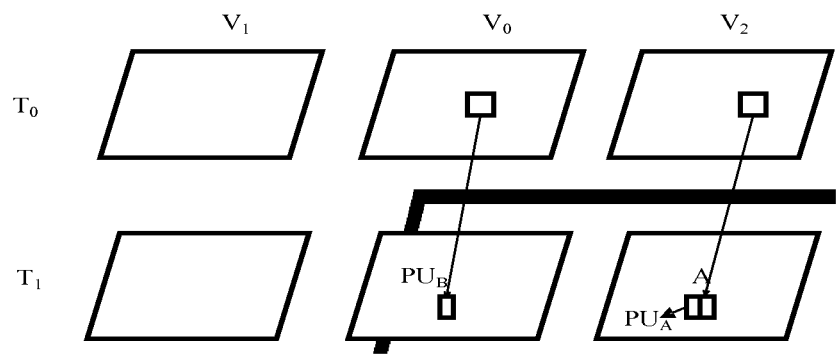
FIG. 8 is a schematic diagram illustrating encoding/decoding residual prediction according to an application example of the present invention.

The present invention will be described below by way of an application example. As shown in FIG. 8, it is a schematic diagram illustrating encoding/decoding residual prediction according to an application example of the present invention. Where, $T_0$ represents a moment 0; $T_1$ represents a moment 1; $V_0$ represents a visual angle 0; $V_1$ represents a visual angle 1; $V_2$ represents a visual angle 2; A represents a current encoding/decoding unit; $PU_A$ represents a prediction unit in the A; $PU_B$ represents a corresponding unit of the A in the $V_0$; $V_0$, $V_1$ and $V_2$ are three visual angles which need to be encoded; and $T_0$ and $T_1$ represent time points. Encoding sequence is first to encode images in three visual angles of the $T_0$ moment, and then to encode images in three visual angles of the $T_1$ moment; encoding sequence for three visual angles is first to encode $V_0$, then to encode $V_1$, finally to encode $V_2$. The solution described in the present invention works in the non-independent encoding/decoding visual angle.

When encoding an encoding unit (donated by A) in an inter frame image, an encoder performs rate-distortion optimizing selection between an intra frame image encoding mode and an inter frame image encoding mode (when encoding an encoding unit in an inter frame image, there are two encoding modes which can be used: an inter frame image encoding mode and an intra frame image encoding mode. When encoding each encoding unit, it needs to perform a choice between these two modes to determine which mode is to be adopted finally. The reason for the choice is that these two encoding modes are suitable for different situations respectively, in which the compression efficiency of the intra frame image encoding mode is higher in some cases while the compression efficiency of the inter frame image encoding mode is higher in other cases). The inter frame image encoding mode is performed two times at most, in which, at the first time, a normal inter frame prediction encoding is performed and a residual of each prediction unit in the A is not predicted. If at least one prediction unit (denoted by $PU_A$) in the A meets the following condition: a time domain predicted residual of a corresponding unit (denoted by $PU_B$) in an adjacent visual angle encoded at the same time is non-zero, then the second time inter frame prediction encoding is performed on the A. In the second time inter frame prediction encoding, when performing motion estimation on the prediction unit $PU_A$ in the A, the corresponding unit $PU_B$ in an adjacent visual angle encoded at the same time is found. If there is a time domain predicted residual in the $PU_B$ and the time domain predicted residual is non-zero, it is needed to judge whether a residual prediction is performed on the $PU_A$ according to the following conditions; otherwise, the residual prediction is not performed on the $PU_A$. The judgment conditions are as follows:

1. When the $PU_A$ adopts a unidirectional prediction: if the $PU_A$ uses a time domain prediction, the predicted residual of the $PU_A$ is predicted by using the time domain predicted residual the $PU_B$, and otherwise, the predicted residual of the $PU_A$ is not predicted.

2. when the $PU_A$ adopts a bi-directional prediction, there are three possibilities in this case: 1) when two prediction block of the $PU_A$ are both time domain prediction blocks, the predicted residual of the $PU_A$ is predicted by using the time domain predicted residual the $PU_B$; 2) when one of two prediction blocks of the $PU_A$ is a time domain prediction block and another is an adjacent visual prediction block, the method for predicting the residual is also adopted, but a used residual signal is a weighted time domain predicted residual of the $PU_B$, and a weight is equal to a weight of the time domain predicted block in motion compensation (the weight can be obtained in an encoder and a decoder. When the encoder does not use the weighted prediction, the weight is equal to ½; when the encoder uses the weighted prediction, the weight is obtained by configuring or calculating parameters in the encoder and then written into a code stream, and thus the decoder can obtain it by decoding); and 3) when two prediction blocks of the $PU_A$ are both adjacent visual prediction blocks, the method for predicting the residual is not used.

The encoder selects the optimal encoding mode of the A from the intra frame prediction, the first time inter frame prediction and the second time inter frame prediction. When the A uses the inter frame prediction mode, it is needed to encode a flag bit of an encoding unit level to identify which inter frame encoding mode is adopted thereby, that is, to identify whether there is a prediction unit adopting a residual prediction therein.

When decoding the encoding unit A adopting the inter frame encoding mode, if the flag bit of the encoding unit level indicates that there is a prediction unit adopting the residual prediction in the A, it is needed to judge, when decoding a prediction unit in the A, whether the prediction unit adopts the residual prediction. As for a prediction unit (denoted by $PU_A$) in the A, a corresponding unit (donated by $PU_B$) in an adjacent visual angle decoded at the same time is found, and if there is a time domain predicted residual in the $PU_B$ and the time domain predicted residual is non-zero, it is needed to judge whether the $PU_A$ has used a residual prediction according to the following conditions; otherwise, the $PU_A$ has not used the residual prediction. The judgment conditions are as follows:

1. When the $PU_A$ adopts a unidirectional prediction: if the $PU_A$ uses a time domain prediction, the $PU_A$ has used the residual prediction, and otherwise, the $PU_A$ has not used the residual prediction. If the $PU_A$ has used the residual prediction, it is needed to add a time domain predicted residual of the $PU_B$ to a predicted residual of the $PU_A$ and then to add the updated predicted residual of the $PU_A$ to a predicted signal of the $PU_A$ to obtain a reconstruction value of the $PU_A$.

2. When the $PU_A$ adopts a bi-directional prediction, there are three possibilities in this case: 1) when two prediction block of the $PU_A$ are both time domain prediction blocks, that is to say, the $PU_A$ has used the residual prediction, it is needed to add a time domain predicted residual of the $PU_B$ to a predicted residual of the $PU_A$ and then to add he updated predicted residual of the $PU_A$ to a predicted signal of the $PU_A$ to obtain a reconstruction value of the $PU_A$; 2) when one of two prediction blocks of the $PU_A$ is a time domain prediction block and another is an adjacent visual prediction block, a weighted residual predicting method is adopted (a weight is equal to a weight of the time domain predicted block in motion compensation), and it is needed to add a weighted time domain predicted residual of the $PU_B$ to a predicted residual of the $PU_A$ and then to add he updated predicted residual of the $PU_A$ to a predicted signal of the $PU_A$ to obtain a reconstruction value of the $PU_A$; and 3) when two prediction blocks of the $PU_A$ are both adjacent visual prediction blocks, the method for predicting the residual is not used, and the a predicted residual of the $PU_A$ is added directly to the a predicted signal of the $PU_A$ to obtain a reconstruction of the $PU_A$.

The above solution of the application example can also be integrated into the 3DV-HTM (three dimensional video coding—High Efficiency Video Coding (HEVC) based test model) 0.3, and the comparison is performed. The testing sequence adopts balloons, a kendo and a newspaper (after the color correction), the resolution of which are all 1024×768.

The testing result is shown in table 1, and it can be seen therefrom that the provided solution can reduce bit rate of Y (luminance signals) of a video image in the non-independent visual angles ($V_1$ and $V_2$ in table 1) up to −0.50% and −0.46% (table 1 also gives data of U (color difference signals) and V (color difference signals), and however, since reducing 1% of the bit rate of the U and the V is roughly equivalent to reducing 0.1% of the bit rate of the Y, the situation of the bit rate changing in the U and the V will not be described herein), improve the video compression ratio of the non-independent visual angles ($V_1$ and $V_2$ in table 1) and enhance the encoding efficiency of the non-independent visual angles ($V_1$ and $V_2$ in table 1). However, since the provided solution does not change the encoding method of the independent visual angles ($V_0$ in table 1), the encoding efficiency of the independent visual angles ($V_0$ in table 1) is not changed.

TABLE 1 testing result

|  |  | $V_0$ | $V_1$ | $V_2$ |
|---|---|---|---|---|
| balloons | Y | 0.00% | −0.46% | −0.53% |
|  | U | 0.00% | −0.72% | −0.70% |
|  | V | 0.00% | −0.69% | −0.77% |
| kendo | Y | 0.00% | −0.72% | −0.58% |
|  | U | 0.00% | −0.80% | −0.36% |
|  | V | 0.00% | −0.72% | −0.43% |
| newspaper | Y | 0.00% | −0.34% | −0.27% |
|  | U | 0.00% | −0.33% | −0.28% |
|  | V | 0.00% | −0.23% | −0.32% |

TABLE 1-continued

| | | testing result | | |
|---|---|---|---|---|
| | | $V_0$ | $V_1$ | $V_2$ |
| Average | Y | 0.00% | −0.50% | −0.46% |
| | U | 0.00% | −0.61% | −0.45% |
| | V | 0.00% | −0.55% | −0.51% |

The application example of the present invention provides a method for predicting a residual in application for three-dimensional (3D) video encoding or multi-visual angle video encoding/decoding, and the solution uses a time domain predicted residual in an encoded adjacent visual angle to predict a time domain predicted residual in a current visual angle. Meanwhile, due to the different characteristics between a time domain predicted residual and an inter-visual predicted residual, the method cannot use the time domain predicted residual to predict the inter-visual predicted residual, and vice versa. As compared to the existing solution in which the time domain predicted residual is used to simultaneously predict a time domain predicted residual and an inter-visual predicted residual, this solution avoids a prediction between residuals with different characteristics, thereby improving the video compression ratio and enhancing the encoding efficiency. This technology does not damage the structure of the existing image unit on the basis of enhancing encoding/decoding efficiencies, thereby conducive to hardware implementation.

Those skilled in the art can understand that various illustrative logical blocks, units and steps listed by the embodiments of the present invention can be implemented by electronic hardware, computer software, or a combination thereof. In order to clearly exhibit the interchangeability between the hardware and the software, functions of the above various illustrative logical blocks, units and steps has been generally described. The implementation of such the functions by the hardware or by the software is dependent on a specific application and the design requirements of the entire system. Those skilled in the art can use a variety of ways, as to each specific application, to implement the function thereof, but this implementation should not be deemed as going beyond the protection scope of the embodiments of the present invention.

The various illustrative logical blocks described in the embodiments of the present invention can all be implemented by a general-purpose processor, a digital signal processor, an application-specific integrated circuit (ASIC), a field programmable gate arrays (FPGQ) or other programmable logical devices, discrete gate or transistor logic, a discrete hardware component, or the design of any combination thereof, or the described functions can be operated thereby. The general-purpose processor can be a micro processor, and optionally, the general-purpose processor can also be any traditional processor, controller, micro controller or state machine. The processor can also be implemented by combining computing devices, for example, a digital signal processor and a micro processor, plurality of micro processors, one or more of micro processor(s) jointing one digital signal processor core, or any other similar configurations.

The methods or the steps of the algorithms described in the embodiments of the present invention can be embedded directly into the hardware, software modules executed by the processor, or the combination thereof. The software modules can be stored in an RAM memory, a flash memory, an ROM memory, an EPROM memory, an EEPROM memory, a register, a hard disk, a removable disc, a CD-ROM or any other form of storage media in the art. Exemplarily, the storage media can be connected to the processor, such that the processor can read information from the storage media and write information in the storage media. Optionally, the storage media can also integrate into the processor. The processor and the storage media can be provided in the ASIC, and the ASIC can be provided in a user terminal. Optionally, the processor and the storage media can also be provided in different components in a user terminal.

In one or more of exemplary design(s), the above functions described in the embodiments of the present invention can be implemented in hardware, software, firmware, or any combination thereof. If being implemented in the software, these functions can be stored in computer-readable media, or can be transmitted in computer-readable media in the form of one or more of instruction(s) or code(s). The computer-readable media comprise computer storage media and communication media which is easy to transferring computer programs from one place to other places. The storage media can be media available for being accessed by any general-purpose of special computers. For example, such the computer-readable media can comprise, but not be limited to, an RAM, an ROM, an EEPROM, a CD-ROM, or other optical disk storage, disc storage or other magnetic storage devices, or any other media which can be used to carry or store program codes in the form of instructions or data structures and in the other from which can be read by general-purpose or special computers or general-purpose or special processor. Furthermore, any connection can be appropriately defined as computer-readable media, for example, if software is one which is transmitted from a server or other remote resources through a coaxial cable, a fiber optic computer, a twisted-pair, a digital subscriber line (DSL) or by the wireless way such as infrared, wireless and microwave etc., the software is included in the defined computer-readable media. The above disk and disc comprise a compressed disc, a laser disc, a compact disk, a DVD, a floppy disk and blu-ray Disk, in which the disc is usually to magnetically copy data while the disk is usually to optically copy data with laser. The above combination can also be included in the computer-readable media.

The above-described particular embodiments further describe in detail the object, the technical solutions and the advantage of the present invention. It should be understood that what are described above are merely preferred embodiments of the present invention, and are not to limit the present invention, and any modifications, equivalents and improvements within the spirit and principle of the present invention should be covered by the protection scope of the present invention.

The invention claimed is:

1. A method for predicting a residual, characterized in that the method is applied to three-dimensional video encoding or multi-visual angle video encoding, the method comprising:
    searching, when performing inter frame image prediction encoding on a prediction unit, a corresponding unit of the prediction unit in an adjacent visual angle encoded at the same time; and
    predicting a time domain predicted residual of the prediction unit based on a time domain predicted residual of the corresponding unit in the encoded adjacent visual angle, the predicting including predicting the time domain predicted residual of the prediction unit based on a weighted time domain predicted residual of the corresponding unit in the encoded adjacent visual angle when the prediction unit adopts a bi-directional prediction and a first one of two prediction blocks of the prediction unit is a time domain prediction block and a second one of the two prediction blocks is an adjacent visual prediction block;

the searching including:
  judging, when performing inter frame image prediction encoding on the prediction unit, whether the prediction unit adopts a time domain prediction; and
  searching, if it is determined the prediction unit adopts the time domain prediction, the corresponding unit of the prediction unit in the adjacent visual angle encoded at the same time; and the judging including:
  judging, according to a flag bit of an encoding unit level, whether a mode adopted by the prediction unit is a mode without residual prediction or a mode with residual prediction; and
  further judging, if the prediction unit adopts the mode with residual prediction, whether the prediction unit adopts the time domain prediction.

2. The method for predicting the residual according to claim 1, characterized in that the predicting of the time domain predicted residual of the prediction unit further includes:
  judging whether the corresponding unit in the encoded adjacent visual angle includes the time domain predicted residual and whether the time domain predicted residual is non-zero; and
  predicting, if it is determined that the corresponding unit in the encoded adjacent visual angle includes the time domain predicted residual and the time domain predicted residual is non-zero, the time domain predicted residual of the prediction unit based on the time domain predicted residual of the corresponding unit in the encoded adjacent visual angle when the prediction unit adopts a unidirectional prediction; or, otherwise, determining that the predicted residual of the prediction unit does not include the time domain predicted residual and not performing the prediction thereon.

3. An apparatus for predicting a residual, characterized in that the apparatus is applied to three-dimensional video encoding or multi-visual angle video encoding, the apparatus comprising:
  an encoding corresponding search unit for searching, when performing inter frame image prediction encoding on a prediction unit, a corresponding unit of the prediction unit in an adjacent visual angle encoded at the same time; and
  an encoding residual prediction unit for predicting a time domain predicted residual of the prediction unit based on a time domain predicted residual of the corresponding unit in the encoded adjacent visual angle, the encoding residual prediction unit including an encoding residual prediction module for predicting the time domain predicted residual of the prediction unit based on a weighted time domain predicted residual of the corresponding unit in the encoded adjacent visual angle when the prediction unit adopts a bi-directional prediction and a first one of two prediction blocks of the prediction unit is a time domain prediction block and a second one of the two prediction blocks is an adjacent visual prediction block;
  the encoding corresponding search unit includes:
    an encoding time domain judgment module for judging, when performing inter frame image prediction encoding on the prediction unit, whether the prediction unit adopts a time domain prediction; and
    an encoding corresponding search module for searching, if it is determined the prediction unit adopts the time domain prediction, the corresponding unit of the prediction unit in the adjacent visual angle encoded at the same time; and
  the encoding time domain judgment module is further configured for judging, according to a flag bit of an encoding unit level, whether a mode adopted by the prediction unit is a mode without residual prediction or a mode with residual prediction; and further judging, if the prediction unit adopts the mode with residual prediction, whether the prediction unit adopts the time domain prediction.

4. The apparatus for predicting the residual according to claim 3, characterized in that the encoding residual prediction unit comprises:
  an encoding adjacent visual angle judgment module for judging whether the corresponding unit in the encoded adjacent visual angle includes the time domain predicted residual and whether the time domain predicted residual is non-zero; and
  the encoding residual prediction module to predict, if it is determined that the corresponding unit in the encoded adjacent visual angle includes the time domain predicted residual and the time domain predicted residual is non-zero, the time domain predicted residual of the prediction unit based on the time domain predicted residual of the corresponding unit in the encoded adjacent visual angle when the prediction unit adopts a unidirectional prediction; or, otherwise, determine that the predicted residual of the prediction unit does not include the time domain predicted residual and not performing the prediction thereon.

5. A method for predicting a residual, characterized in that the method is applied to three-dimensional video decoding or multi-visual angle video decoding, the method comprising:
  judging, when performing inter frame image prediction decoding on a prediction unit, whether the prediction unit adopts a residual prediction;
  searching, if the prediction unit adopts the residual prediction, a corresponding unit of the prediction unit in an adjacent visual angle decoded at the same time; and
  predicting a predicted residual of the prediction unit based on a time domain predicted residual of the corresponding unit in the decoded adjacent visual angle, the predicting including, when the prediction unit adopts a bi-directional prediction and a first one of two prediction blocks of the prediction unit is a time domain prediction block and a second one of the two prediction blocks is an adjacent visual prediction block:
    adding a weighted time domain predicted residual of the corresponding unit in the decoded adjacent visual angle to the predicted residual of the prediction unit to serve as an updated predicted residual of the prediction unit, and
    adding the updated predicted residual of the prediction unit to a predicted signal of the prediction unit to obtain a reconstruction of the prediction unit;
  the judging including:
    judging, when performing inter frame image prediction decoding on the prediction unit, whether a mode adopted by the prediction unit is a mode without residual prediction or a mode with residual prediction according to a flag bit of an encoding unit level; and further judging, if the prediction unit adopts the mode with residual prediction, whether the prediction unit adopts the time domain prediction;

searching, if the prediction unit adopts a time domain prediction, the corresponding unit of the prediction unit in the adjacent visual angle decoded at the same time;

judging whether the corresponding unit in the decoded adjacent visual angle includes the time domain predicted residual and whether the time domain predicted residual is non-zero; and determining the prediction unit adopts the residual prediction if the corresponding unit in the decoded adjacent visual angle includes the time domain predicted residual and the time domain predicted residual is non-zero.

6. The method for predicting the residual according to claim 5, characterized in that the predicting of the time domain predicted residual of the prediction unit further includes:

when the prediction unit adopts a unidirectional prediction, adding the time domain predicted residual of the corresponding unit in the decoded adjacent visual angle to the predicted residual of the prediction unit to serve as the updated predicted residual of the prediction unit, and then adding the updated predicted residual of the prediction unit to the predicted signal of the prediction unit to obtain the reconstruction of the prediction unit; or, adding directly, when the prediction unit adopts a bi-directional prediction and two prediction blocks of the prediction unit are both adjacent visual prediction blocks, the predicted residual of the prediction unit to the predicted signal of the prediction unit to obtain the reconstruction of the prediction unit.

7. An apparatus for predicting a residual, characterized in that the apparatus is applied to three-dimensional video decoding or multi-visual angle video decoding, the apparatus comprising:

a decoding residual prediction judgment unit for judging, when performing inter frame image prediction decoding on a prediction unit, whether the prediction unit adopts a residual prediction;

a decoding corresponding search unit for searching, if the prediction unit adopts the residual prediction, a corresponding unit of the prediction unit in an adjacent visual angle decoded at the same time; and a decoding residual prediction unit for predicting a predicted residual of the prediction unit based on a time domain predicted residual of the corresponding unit in the decoded adjacent visual angle, the decoding residual prediction unit to, when the prediction unit adopts a bi-directional prediction and a first one of two prediction blocks of the prediction unit is a time domain prediction block and a second one of the two prediction blocks is an adjacent visual prediction block, add a weighted time domain predicted residual of the corresponding unit in the decoded adjacent visual angle to the predicted residual of the prediction unit to serve as an updated predicted residual of the prediction unit, and add the updated predicted residual of the prediction unit to a predicted signal of the prediction unit to obtain a reconstruction of the prediction unit;

the decoding residual prediction judgment unit comprises:

a decoding time domain judgment module for judging, when performing inter frame image prediction decoding on the prediction unit, whether a mode adopted by the prediction unit is a mode without residual prediction or a mode with residual prediction according to a flag bit of an encoding unit level; and further judging, if the prediction unit adopts the mode with residual prediction, whether the prediction unit adopts the time domain prediction;

a decoding adjacent visual angle judgment module for searching, if the prediction unit adopts the time domain prediction, the corresponding unit of the prediction unit in the adjacent visual angle decoded at the same time; and for judging whether the corresponding unit in the decoded adjacent visual angle includes the time domain predicted residual and whether the time domain predicted residual is non-zero; and a decoding residual prediction judgment module for determining the prediction unit adopts the residual prediction if the corresponding unit in the decoded adjacent visual angle includes the time domain predicted residual and the time domain predicted residual is non-zero.

8. The apparatus for predicting the residual according to claim 7, characterized in that, the decoding residual prediction unit is further to, when the prediction unit adopts a unidirectional prediction, add the time domain predicted residual of the corresponding unit in the decoded adjacent visual angle to the predicted residual of the prediction unit to serve as the updated predicted residual of the prediction unit, and add the updated predicted residual of the prediction unit to the predicted signal of the prediction unit to obtain the reconstruction of the prediction unit; or, add directly, when the prediction unit adopts a bi-directional prediction and two prediction blocks of the prediction unit are both adjacent visual prediction blocks, the predicted residual of the prediction unit to the predicted signal of the prediction unit to obtain the reconstruction of the prediction unit.

* * * * *